United States Patent Office 3,300,470
Patented Jan. 24, 1967

3,300,470
REACTION PRODUCTS OF PROTEIN WITH CYANAMIDE UNDER ACIDIC CONDITIONS
Harland H. Young, Western Springs, and Stewart B. Luce, La Grange, Ill., assignors to Swift & Company, Chicago, Ill., a corporation of Illinois
No Drawing. Filed Oct. 4, 1963, Ser. No. 313,746
8 Claims. (Cl. 260—117)

This invention relates in general to modified proteinaceous materials and to a method for upgrading said materials. More particularly, the invention concerns the treatment of water-soluble, proteinaceous materials with a stabilized cyanamide solution whereby valuable water-insoluble, proteinaceous derivatives are obtained.

It is well known that cyanamide, usually prepared by reacting calcium cyanamide with sulfuric acid, will react with amines, ammonia, and ammonium salts to produce guanidine or guanidino-substituted compounds. It is also well known that cyanamide will react with a host of compounds containing an active hydrogen. For example, cyanamide and hydrogen sulfide form thiourea while cyanamide with an alcohol or phenol form O-alkyl and O-aryl pseudo ureas (sometimes called isoureas). In conjunction with these reactions, cyanamide prepared from calcium cyanamide will polymerize with extreme rapidity to form dicyandiamide. This spontaneous dimerization has accounted for the normally poor yield obtained by the various reactions of cyanamide when prepared from calcium cyanamide.

In addition to the above reactions, cyanamide reacts with alpha amino acids to form carboxy alkyl guanidines. A particular example of this type of reaction is the reaction of glycine with cyanamide in the presence of alkali, such as ammonia to form glycocyamine. Generally, these N-guanidino-substituted amino compounds are water-soluble, producing compositions of limited utility. The water-solubility of guanidine, thiourea, urea, and alkyl-isourea derivatives is quite expected since urea, amides, guanidine salts and the like are used for their peptizing action.

Inasmuch as proteins contain a multiplicity of the above-mentioned reactive groups ($NH_2$, OH, SH, etc.) it was expected that cyanamide would produce a series of guanidine or urea derivatives having somewhat different isoelectric points provided no appreciable dimerization were to occur. Also, since guanidine and urea are normal peptizing agents for proteinaceous material, it was felt that the product produced by reacting proteins with cyanamide would also be water-soluble. Contrary to this, it was found that the reaction products became water-insoluble upon drying and probably do not contain the guanidino radical. As will be shown in the subsequent discussion and examples, results were obtained which were both totally unexpected and difficult to explain.

It is an object of this invention to provide a method for upgrading proteinaceous materials.

It is also an object of this invention to provide new types of proteinaceous materials in good yields.

It is a further object of this invention to provide a method for converting water-soluble proteins into water-insoluble, proteinaceous materials.

Further objects, if not specifically set forth herein, will become apparent to one skilled in the art during the course of the description which follows.

Broadly, the present invention comprises treating protein materials with cyanamide. Water-soluble proteins are reacted with small amounts of stabilized cyanamide to produce derivatives which are water-soluble until their dried product is subjected to dry heat or until it remains dry for some time. The cyanamide-treated, water-soluble proteins manifest no change as long as their solution (warm) or gel (cold) is kept moist or not allowed to dry. Drying, however, converts the soluble, proteinaceous material into the insoluble form. The time required for this conversion may be weeks, or even months, when the drying is conducted at room temperature, but may be exceedingly fast, if conducted at 100° C. or more. After heating the air-dried film, the protein-cyanamide reaction product will swell in water, but it does not dissolve, even if heated in boiling water.

More specifically, the invention contemplates the treatment of water soluble proteins with a small amount, i.e., 1–12% and preferably 2–5%, of cyanamide, under acidic, aqueous conditions. The mixture is thoroughly agitated, poured into shallow containers and solidified by cooling. The product is normally cut into strips and air-dried. Various factors, such as viscosity change, heating, pH effects, and drying temperature, all play a part in producing the protein derivatives of the invention. Such factors will be brought out more fully as the description of the invention proceeds.

In order to eliminate or at least minimize dimerization of the cyanamide reactant, stabilized cyanamide solutions are used. Although cyanamide solutions are fairly stable, they are extremely sensitive to even minute traces of alkali. In the presence of alkali (pH 8–12), cyanamide will dimerize to dicyandiamide, whereas at a pH below 2 or above 12, urea is the main product formed by hydrolysis of the cyanamide. The optimum pH for storage of cyanamide solutions is about 4–5. Its stability can be maintained and enhanced by traces of acids, such as phosphoric, sulfuric, boric, and acetic acid.

We prefer to use a 50% aqueous hydrogen cyanamide solution, but other concentrations may be utilized. By aqueous hydrogen cyanamide solution, we means free cyanamide, i.e., uncombined with metallic ions such as calcium, sodium or potassium. A specific hydrogen cyanamide solution is illustrated by the product sold under the name Aero-Cyanamide-50, produced by the American Cyanamid Company. Aero-Cyanamide-50 is a clear aqueous solution containing 50% cyanamide, about .1% thiourea, less than 5% other nitrogen compounds such as dicyandiamide and urea, less than 50 p.p.m. of metal impurities and about 2% monosodium phosphate buffer.

In order to eliminate or at least minimize the polymerization of cyanamide to dicyandiamide, the pH and temperature of the aqueous hydrogen cyanamide solution should be carefully regulated. The cyanamide solution should be stored at as low a temperature as is possible and the pH should be maintained between about 4.5 to 5 by the periodic addition of 10% phosphoric acid. If the cyanamide solution is stored at about 30° F., the cyanamide will decompose at a rate of about .25% per week. At this temperature, the pH of the solution should be adjusted to 4.5 to 5.0 about once every 3 months with 10% phosphoric acid. About 4% of the cyanamide will decompose each week if the solution is stored at 100° F. In such a case, the solution should be acidified to a pH of 4.5 to 5.0 about once every 3 days. As stated before, the decomposition of cyanamide produces dicyandiamide and urea which, in turn, increases the alkalinity of the solution. The decomposition reaction is exothermic and the heat produced, along with the increase in alkalinity promote the decomposition of the cyanamide. For these reasons, it is emphasized that the aqueous cyanamide solution should be stored at as low a temperature as possible.

The protein raw material may be any water-soluble proteinaceous material that has not been subjected to gross hydrolysis. Examples include egg albumin, serium albumin of blood, lactalbumin of milk, the histones, protamines, etc. Gelatin and glues are the commercially significant materials which may be used. Numerous other poteinaceous materials react with cyanamide but no great change in properties or characteristics is apparent. In fact when glue and gelatin are so treated there is no manifested change in viscosity or other physical properties until they have been heated. Experiments applied to sheepskins prior to tanning produced no outstanding advantages other than a small rise in the shrink temperature.

In carrying out the process of the invention, a water-soluble protein such as glue or gelatin is admixed with water and heated to solubilize the protein and produce a clear solution. A cyanamide solution, having a pH of less than 7, is added and the system thoroughly mixed. The reaction product is normally poured into pans and allowed to solidify by means of cooling. Upon solidification of the product, it is cut into strips, and after drying is heated to convert the product into its insoluble form.

It should be noted, however, that the step of pouring the product into shallow pans is not critical and indeed may be omitted if certain types of articles are desired. For example, the aqueous protein-cyanamide solution may be aerated and whipped so as to form a foam type product. This product, when dried, may be heated by means of dry, hot air of a temperature of about 80° C. to 110° C. Subjection to dry heat will dehydrate and insolubilize the foamed material. The protein-cyanamide foamed product can be used as a surgical sponge. Such a sponge has exceptional value in that it is substantially completely water-insoluble but will eventually disintegrate by enzymatic action if accidentally left in a body.

As stated above, the pH of the aqueous cyanamide solution is about 4–5. The cyanamide-protein reaction must be carried out under acidic conditions in order to produce a product which will become water-insoluble upon heating. If the reaction is conducted under alkaline conditions, the product is water-soluble and remains so even after prolonged drying. The alkali reaction of alpha amino acids with cyanamide to produce water-soluble products is old and we make no claim as to their novelty. However, the acidic type process of reacting proteins with cyanamide is believed to be new and the purpose of the instant invention is to cover such a process. In accordance with the instant invention the cyanamide solution contains sufficient hydrogen ions to render the reaction acidic. However, additional acids may be added in small quantities to produce a pH of less than 4. Such acids include sulfuric, hydrochloric, phosphoric, boric, acetic, etc.

Generally, there is no need to heat the protein-cyanamide mixture but heating may be desirable in some cases. If heated, the temperature should range between room temperature (20–25° C.) and about 100° C. Temperatures of less than 100° C. are preferred since elevated temperatures cause objectionable decomposition of the cyanamide reactant.

The reactants do not have to be in contact for any appreciable length of time; a thorough mixing of the two is usually sufficient. However, the protein-cyanamide reaction product is water-soluble until it is subjected to dry heat. The cyanamide-treated water-soluble proteins manifest no change as long as their solution (warm) or gel (cold) is not allowed to dry. Prolonged drying on heating, however, converts the soluble product into its water-insoluble form. A hot air drying temperature of about 40–250° C. may be used. We prefer a drying temperature of 80° C. to 110° C.

It is preferred to use a 50% aqueous hydrogen cyanamide solution, but other concentrations may be utilized. About 1–12 grams of cyanamide (2–25 grams of aqueous 50% cyanamide solution) for every 100 parts of protein are used. However, with most proteins, 1–5% of cyanamide, based upon the weight of the protein, is sufficient.

A number of examples are set out below as illustrations of the process and the products produced in accordance with the teachings of the instant invention. They are not, however, intended to be construed as placing limitations on the scope of the invention other than those set out in the appended claims.

EXAMPLE I 100 grams of gelatin (300 gm. bloom) was soaked in 400 grams of cold water for about 15 minutes. The mixture was heated to give a clear solution and then cooled to about 60° C. 12 grams of an aqueous hydrogen cyanamide solution (50% cyanamide and having a pH of about 4–5) was added and mixed thoroughly with the gelatin. The solution was poured into a shallow pan and placed in a refrigerator. After the product had solidified, it was cut into strips. A portion of the product was dried at normal room temperature (20–25° C.) and another portion dried at 40° C. The product dried at about 20–25° C. remained water-soluble even after 66 hours while the product dried at 40° C. was no longer completely water-soluble. The water-soluble solution jelled on cooling to room temperature and remained in a meltable state even after 4 days at this temperature. It also remained in a meltable state for 8 weeks when held at refrigeration temperature (10° C.). A portion of the cyanamide-treated gelatin, which had been dried at room temperature, was heated to about 50–55° C. to determine the length of time necessary to convert it into its water-insoluble form. After 4 hours at 50–55° C., it was only slightly soluble and in 7½ hours it was completely insoluble but swelled in water.

EXAMPLE II 100 grams of gelatin (300 gm. bloom) was soaked in 400 grams of cold water for about 15 minutes and heated to give a clear solution. The solution was cooled to about 60° C. and 12 grams of aqueous hydrogen cyanamide solution (50% cyanamide) was mixed therein. Sufficient ammonia was added to give the solution a pH of about 8. The solution was poured into trays and cooled in a refrigerator. Upon heating to a temperature of about 50–55° C., it remained water-soluble even after 24 hours of constant heating. This example shows that the cyanamide and gelatin must be reacted under acidic conditions in order to produce a product which will be converted to its water-insoluble from upon dry heating.

EXAMPLE III 100 grams of bone glue (180 gm. bloom) was dissolved in 300 grams of water. 12 grams of aqueous hydrogen cyanamide solution (50% cyanamide) was mixed thoroughly with the glue solution. This solution had a pH of about 5.5. It was divided into 4 equal parts and then treated with sulfuric acid so as to lower the pH.

| Sample | Sulfuric Acid Added | Resulting pH |
| --- | --- | --- |
| A | | 5.5 |
| B | 5 drops of 6 N Sulfuric Acid | 5.1 |
| C | 1 cc. of 6 N Sulfuric Acid | 4.5 |
| D | 5 cc. of 6 N Sulfuric Acid | 1.8 |

All the samples, except C, remained water-soluble when air dried for 4 hours at 50–55° C. When heated to 115° C. all samples became water-insoluble within 5 minutes. In contrast to this, untreated glue (glue not reacted with cyanamide) remained water-soluble even after heating for one hour at a temperature of 115° C. The only difference noted in the samples seemed to be the hardness of the water-soaked test pieces; at the lower pH the glue seemed to be slightly stiffer after heating in water.

EXAMPLE IV 100 grams of bone glue (180 gm. bloom) was dissolved in 200 grams of water. The thoroughly mixed solution was divided into 4 parts and aqueous hydrogen cyanamide solution added as follows.

| Sample: | Amount of 50% cyanamide solution added, gms. |
|---|---|
| A | 2 |
| B | 1.5 |
| C | 1.0 |
| D | 0.5 |

The 4 samples were air dried and then heated in an oven at 115° C. for about one hour. All the samples were completely insoluble in water at the end of this period. The above experiments show the effect of low concentration of cyanamide on the insolubilization of glue.

EXAMPLE V

A solution of 100 grams of bone glue (180 gm. bloom) and 200 grams of water was divided into 4 equal portions. Aqueous hydrogen cyanamide solution was added as follows.

| Sample: | Amount of 50% cyanamide solution added, gms. |
|---|---|
| A | 5 |
| B | 12.5 |
| C | 25 |
| D | 50 |

The four samples were poured into shallow pans and air dried at room temperature. Sample A could be peeled from the pan but samples B, C and D were too soft. Even after 2 days of air drying, samples C and D were too soft to be peeled from the pan. It is apparent that the high cyanamide concentrations exert a peptizing effect on the glue. Sample A (the product treated with 5 grams of 50% cyanamide) was heated to various temperatures to determine the length of time needed to insolubilize the material. At a temperature of 112° C. the material became insoluble in about 5 minutes while at 92° C. the time required was about 15 minutes. At 83° C. the material became completely insoluble in 20 minutes. 30 minutes was required when the temperature was 75° C. and even then the material was only partially insoluble. Heat tests on sample B showed that it became insoluble after 30 minutes of heating at 83° C. while sample C required about 15 minutes at 83° C. Sample D was still fluid after 5 days of drying at room temperature.

EXAMPLE VI

The following shows the effect of the concentration of cyanamide on the time required to produce $H_2O$ insolubility when heated at 85° C. (185° F.).

| Percent of cyanamide based on gelatin | Time of heating in minutes at 85° C. | | | | |
|---|---|---|---|---|---|
| | 0 | 2 | 5 | 10 | 15 |
| None | Sol | Sol | Sol | Sol | Sol. |
| 2½ | Sol | Sol | Sol | Sol | Insol. (sw). |
| 5 | Sol | Sol | Insol. (sw) | | |
| 10 | Sol | Inc. sol | Insol. (sw) | | |
| 25 | Sol | Insol | Insol | | |

Sw means that the product will swell in hot water.

Since the highest concentrations developed insolubility very fast at 85° C., other samples were heated at 55° C.

| Percent of cyanamide based on gelatin | Time of heating in minutes at 55° C. | | | | | | |
|---|---|---|---|---|---|---|---|
| | 0 | 2 | 5 | 10 | 15 | 30 | 60 |
| 10 | Sol | | Sol | Sol | Sol | Sol | Small amount insol. |
| 25 | Sol | Sol | Sol | Sol | Slight amount insol. | Insol | |

EXAMPLE VII

*Heat treatment of gelatin with and without cyanamide*

| | Jelly Strength | Viscosity |
|---|---|---|
| 300 gm. Bloom Gelatin | 280 | 48 |
| 300 gm. Bloom Gelatin dissolved, air dried, and heated ½ hr. 85° C | 286 | 43 |
| Same and 2½% cyanamide heated 10 min. 85° C | 288 | 77 |
| Same and 5% cyanamide heated 2 min. 85° C | 277 | 49 |
| Same and 10% cyanamide heated 45 min. 55° C | 230 | 62 |

EXAMPLE VIII

Flocculation tests were run on 1% solution of the above gelatins at pH of 6–7 and at pH of 3–4. A slurry of clay made by stirring 20 grams of clay in 1000 cc. of water was used to flocculate. A 250 cc. graduate was filled with a freshly stirred slurry, the graduate upended three times and the time measured for the clay to settle to 125 cc. This gave a blank, and to compare flocculants, the desired amount of the 1% solution was added before upending the graduate. In the table below, the percent of blank refers to the improvement of settling time for clay suspension. If the clay settles in 10 minutes, then 25% of blank would signify an additive that settles the same amount of clay in 2½ minutes.

| | Flocc. Percent Blank | | | | | |
|---|---|---|---|---|---|---|
| | pH 6-7 | | | pH 3-4 | | |
| | ¼ cc. | ½ cc. | 1½ cc. | ¼ cc. | ½ cc. | 1½ cc. |
| 300 gm. Bloom gelatin heated ½ hr. 85° C | 57.7 | 48.2 | 40.8 | 48.3 | 37.0 | 30.6 |
| Same and 2½% cyanamide heated 10 min. 85° C | 40.3 | 30.8 | 16.1 | 48.6 | 43.5 | 26.2 |
| Same and 5% cyanamide heated 2 min. 85° C | 46.6 | 34.9 | 25.2 | 43.0 | 41.3 | 33.0 |
| Same and 10% cyanamide heated 45 min. 55° C | 50.0 | 36.8 | 24.2 | 40.4 | 32.8 | 33.8 |

The process and products set forth above are to be clearly distinguished from the reaction of amines and amino acids with cyanamide to yield corresponding guanidino derivatives. There successful completion of the reaction requires the presence of alkali while the instant invention utilizes acidic conditions. The instant invention is also distinguished from the reaction of proteins with carbodiimides.

The products of this invention are particularly useful as improved flocculating agents. It is possible to improve the flocculating power of glue without impairment of its other physical properties. In addition, it is possible to have control of the solubility of glue and gelatin by heat treatment in accordance with the teachings set forth in the disclosure. The treated gelatin products are suitable for photographic layers. Further, the products may be whipped, aerated to a foam and baked to produce surgical sponges which are insoluble in water but which dissolve by enzymatic action. The improved gelatin may be made at the time of use by adding stabilized cyanamide to the gelatin solution. This is of particular value when gelatin is used in microencapsulation processes.

Obviously, many modifications and variations of the invention as hereinbefore set forth may be made without departing from the spirit and scope thereof, and, accordingly, only such limitations should be imposed as are indicated in the appended claims.

We claim:

1. A process for modifying and upgrading water-soluble proteinaceous materials which comprises reacting a water-soluble proteinaceous material selected from the group consisting of glue and gelatin with cyanamide under acidic conditions of a pH of between about 2 and 7 and at a temperature of less than about 100° C.

2. The product produced by the process of claim 1.

3. A process for modifying and upgrading water-soluble proteinaceous materials which comprises reacting a proteinaceous material selected from the group consisting of glue and gelatin with from 1-12%, by weight based upon the weight of said proteinaceous material, of an aqueous, stabilized cyanamide solution under acidic conditions at a pH of between about 2 and 7 and at a temperature of less than about 100° C.

4. A process for modifying and insolubilizing water-soluble proteinaceous materials which comprises reacting a water-soluble proteinaceous material with stabilized cyanamide at a pH of between about 2 and 7 and at a temperature of less than about 100° C., and drying the resulting modified proteinaceous material whereby a substantially water-insoluble proteinaceous material is formed.

5. The product produced by the process of claim 4.

6. A process for modifying and insolubilizing water-soluble proteinaceous materials which comprises reacting a water-soluble proteinaceous material with stabilized cyanamide at a pH of between about 2 and 7 and at a temperature less than about 100° C., drying the resulting modified proteinaceous material, and subjecting said modified proteinaceous material to dry heat whereby a substantially water-insoluble proteinaceous material is formed.

7. A process for modifying and insolubilizing water-soluble proteinaceous materials which comprises dissolving in water a proteinaceous material selected from the group consisting of glue and gelatin, admixing stabilized cyanamide with said proteinaceous material under acidic conditions, said stabilized cyanamide being present in an amount of between about 1-12%, by weight, based upon the weight of said proteinaceous material so that a modified proteinaceous product is produced, solidifying and drying said modified proteinaceous product, and subjecting said product to dry heat in the temperature range of between about 40° C.–250° C. whereby a substantially water-insoluble, proteinaceous substance is produced.

8. A process for insolubilizing a water-soluble proteinaceous material which comprises reacting a member selected from the group consisting of glue and gelatin with a buffered aqueous hydrogen cyanamide solution having a pH of between about 4–5, said cyanamide being present in an amount of between about 2–5%, by weight, based upon the weight of the proteinaceous material, drying the product produced by the reaction, and subjecting said reaction product to a temperature of less than about 100° C. whereby a substantially water-insoluble proteinaceous substance is formed.

References Cited by the Examiner

UNITED STATES PATENTS 2,465,357  3/1949  Correll _____ 106—122

OTHER REFERENCES

Cohn and Edsall: Proteins, Amino Acids, and Peptides, New York, Reinhold, 1943 (chapter 23 relied on).

Wertheim, E.: Organic Chemistry, 3rd edition, New York, McGraw-Hill, 1951 (pages 335–336 relied on).

Gustavson, K. H.: Chemistry and Reactivity of Collagen, New York, Academic Press, 1956 (pages 282–283 relied on).

Mechan et al.: Industrial and Engineering Chemistry, volume 39, pages 1023 et seq., August 1947.

Annalen der Chemie, Bd. 633–637, October 1960, Losse et al., pages 144–149.

WILLIAM H. SHORT, *Primary Examiner.*

LOUISE P. QUAST, *Examiner.*

H. S. SCHAIN, *Assistant Examiner.*

UNITED STATES PATENT OFFICE
CERTIFICATE OF CORRECTION

Patent No. 3,300,470                  January 24, 1967

Harland H. Young et al.

It is hereby certified that error appears in the above numbered patent requiring correction and that the said Letters Patent should read as corrected below.

Column 2, line 35, for "means" read -- mean --; line 62, for "increases" read -- increase --; line 70, for "serium" read -- serum --; column 4, line 42, for "from" read -- form --; column 8, line 29, after "condition," insert -- of a pH of between about 2 and 7 --.

Signed and sealed this 14th day of November 1967.

(SEAL)
Attest:

Edward M. Fletcher, Jr.                         EDWARD J. BRENNER
Attesting Officer                                Commissioner of Patents